Figure 1:
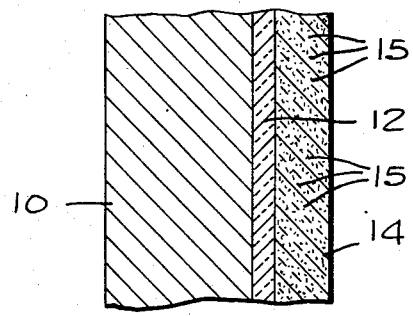

United States Patent [19]
Gibson et al.

[11] 3,770,487
[45] Nov. 6, 1973

[54] REFRACTORY COMPOSITES

[75] Inventors: James O. Gibson; Robert L. Schumacher; Thomas W. Gore, all of Richland, Wash.

[73] Assignee: McDonnell Douglas Corporation, Santa Monica, Calif.

[22] Filed: Jan. 28, 1971
(Under Rule 47)

[21] Appl. No.: 110,485

[52] U.S. Cl................ 117/46 CA, 106/55, 106/56, 106/57, 117/33, 117/46 CA, 117/65.2, 117/94, 117/119, 117/135.1, 117/169 A, 161/170
[51] Int. Cl....................... C04b 35/52, C04b 35/58
[58] Field of Search................... 117/46 CA, 46 CB, 117/26, 100 A, 100 B; 252/62; 106/56, 57; 161/170; 264/29, 86, 87

[56] References Cited
UNITED STATES PATENTS

| | | | |
|---|---|---|---|
| 3,140,190 | 7/1964 | Di Lazzaro | 106/56 |
| 3,325,300 | 6/1967 | Wise et al. | 106/56 |
| 3,340,077 | 9/1967 | Alper et al. | 106/56 |
| 3,189,477 | 6/1965 | Shaffer | 117/46 CA |
| 3,458,341 | 7/1969 | Diefendorph | 117/46 CG |
| 3,470,003 | 9/1969 | Waylett | 106/56 |
| 3,547,681 | 12/1970 | Lawthers et al. | 117/46 CA |

FOREIGN PATENTS OR APPLICATIONS

| | | | |
|---|---|---|---|
| 986,179 | 3/1965 | Great Britain | 106/56 |

*Primary Examiner*—William D. Martin
*Assistant Examiner*—William R. Trenor
*Attorney*—Max Geldin

[57] ABSTRACT

Production of oxidation resistant, thermal shock resistant and high strength composites, produced by hot pressing at high temperatures, e.g., about 2,100°C, a mixture preferably of a boride such as hafnium diboride, a silicide such as tungsten disilicide, and a minor portion of discrete carbon particles such as graphite, e.g., a mixture of 66 percent hafnium diboride, 20 percent tungsten disilicide and 14 percent graphite fibers, by weight, against a high temperature resistant substrate, e.g., a metal such as tantalum, to form an integral bonded composite coating on said substrate.

27 Claims, 2 Drawing Figures

JAMES O. GIBSON
ROBERT L. SCHUMACHER
THOMAS W. GORE
INVENTORS

BY Max Geldin

ATTORNEY

REFRACTORY COMPOSITES

This invention relates to composites and particularly to a high oxidation resistant and high strength composite having a matrix of a refractory metal compound mixture of certain borides and silicides, containing a minor portion of carbon particles, particularly graphite, dispersed therein, such composite being integrally bonded to a substrate surface for protection thereof, and to a process for producing a coating of such refractory composite on a high temperature resistant substrate.

Many operating structural parts such as aircraft and spacecraft reentry structural members, turbine blades, and the like, operate under environmental conditions, such as high temperatures and oxidizing atmospheres requiring that such members be protected by the application of coatings having high oxidation resistance and high strength at elevated temperatures. Thus, for example, such coatings are required to protect metal and graphite substrates in oxidizing atmospheres for extended periods of time at temperatures up to about 2,000°C. Coatings for thermionic diode applications involving combustion heating at temperature of the order of 1,800°C. also are required. High temperature load-bearing coating and protective materials in oxidizing atmospheres are also necessary for protection of fuel block support members, e.g., radioisotope fuel blocks functioning as either atomic batteries or as thermal heat sources for aerospace systems, rocket nozzle liners, reentry vehicles, and the like.

In the copending U. S. applications Ser. Nos. 15,525 and 15,526, of J. O. Gibson, et al., both filed Mar. 2, 1970, is disclosed composites composed of a refractory metal compound mixture of $HfB_2$, $WSi_2$ and SiC, and a minor portion of graphite fibers. Although such composites containing silicon carbide are particularly effective at extremely high operating temperatures in excess of about 2,500°C and up to about 2,800°C and above, and provide good oxidation resistance under such conditions, it has been found that when such composites are exposed to elevated temperatures not in excess of about 2,200°C., especially under ablation conditions, the silicon carbide present forms an extremely high melting temperature glass having a high viscosity over the temperature range 1,500° to 2,200°C, with the other components of the refractory mixture noted above, and as result, oxidation proceeds rapidly through the composite to the substrate, causing disintegration thereof. Hence, under these conditions the above noted refractory metal compound mixture containing silicon carbide and graphite fibers does not possess the required high oxidation resistance.

Further, the combustion of SiC with oxygen yields a gaseous product, CO, as pointed out by the following reaction:

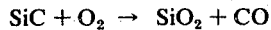

$$SiC + O_2 \rightarrow SiO_2 + CO$$

In many oxidizing conditions, it is desirable to minimize the amount of gas release (bubbling) through the high-temperature glass which is plastic at the above-noted use temperature of between about 1,500° and about 2,200°C.

U. S. Pat. No. 3,189,477 discloses a refractory coating of a boride such as hafnium boride, and a silicide such as tungsten silicide, and a binder material, e.g., about 2 percent polyvinyl alcohol. The coating is applied to a cellular ceramic and fired to form a low density composite which does not contain carbon particles as an essential constituent and hence is not sufficiently thermally shock resistant for many applications where a refractory composite is required to possess both high oxidation resistance as well as thermal shock resistance, and high strength, as for example the protection of structural members of substrates subjected to sharply varying elevated temperature conditions such as in aircraft, reentry vehicles, and the like.

In U. S. Pat. No. 3,140,190, there is disclosed a graphite base ceramic refractory composition comprising a graphite base in an amount of about 30 to about 40 percent by weight of the constituents, molybdenum disilicide and titanium diboride. A binder such as pitch is mixed into the mixture, the mixture compressed, cured at relatively low temperature and then fired in an inert atmosphere. However, employing the large amount of graphite as the base component of the composition and the pitch according to the patent, results in a thermally cured body in which the graphite and carbon present are well over 50 percent by volume of the composite, thus undesirably making such graphite and carbon the matrix phase. The resulting composite has insufficient oxidation resistance and insufficient strength for many high temperature operations, due to the above noted relatively large graphite and carbon content, and relatively low refractory or ceramic content.

U. S. Pat. No. 2,749,254, is directed to a protective coating for a graphite substrate, employing molybdenum disilicide mixed with a resin vehicle to produce a coating preventing oxidation of the graphite substrate. However, for sustained high temperature operation, the resulting fired coating of the patent still lacks sufficient oxidation resistance to fully protect the graphite substrate from oxidation, and because of the resulting low carbon content, which is only about 2 to about 8 percent and furnished by decomposition of the resin vehicle, the coating does not have sufficient thermal shock resistance in many instances.

It has now been found according to the invention that a highly oxidation resistant, thermal shock resistant and high strength composite can be produced according to the invention, by hot pressing a mixture consisting essentially of by weight (a) about 40 to about 70 percent of a boride selected from the group consisting of hafnium diboride, zirconium diboride and titanium diboride, and mixtures thereof, (b) about 16 to about 50 percent of a silicide selected from the group consisting of tungsten disilicide and molybdenum disilicide, and mixtures thereof, and (c) about 10 to about 16 percent of discrete carbon particles selected from the group consisting of graphite, amorphorous carbon and pyrolytic graphite, and mixtures thereof, the hot pressed mixture or composition being substantially free of silicon carbide. The resulting composite, in addition, has the advantageous properties of high thermal conductivity and high impact resistance, assuring good resistance to oxidation due to the hot pressing procedure employed in producing the composite.

It has been found in accordance with the present invention, that by eliminating the silicon carbide present in the hafnium diboride-tungsten disilicide-silicon carbide system of the above copending applications, when the composite is subjected to temperature in the range of between about 1,500° and about 2,200°C, a lower melting low viscosity glass is formed in the absence of the high melting silicon carbide, which provides highly superior oxidation resistance as compared to the systems of the above noted copending applications containing the high melting silicon carbide, since as previously noted such systems including the silicon carbide form an extremely high temperature glass which does not flux or flow at temperatures below about 2,200°C and does not form a highly oxidation resistant coating at such temperatures.

It is noteworthy that nearly all materials which exhibit good resistance to oxidation do in fact, oxidize extremely rapidly. Thus, for example, aluminum metal oxidizes practically instantly on machining. However, the aluminum oxide which is formed is strong, adherent and prevents further oxidation to the substrate by acting as an efficient barrier to oxygen diffusion.

In the above noted temperature range of about 1,500° to about 2,200°C, there is provided according to the present invention a composite system which oxidizes rapidly, but produces an intermediate temperature melting glass which is sufficiently plastic and of sufficiently low viscosity over the above noted temperature range to flow over the substrate, creating an oxygen diffusion barrier and preventing further oxidation. If the glass does not flow over the above temperature range, an oxygen barrier is not formed, and oxidation proceeds rapidly through the substrate material, ultimately destroying it. This latter situation is characteristic of the above noted composite containing SiC of the above copending applications, forming a high temperature glass which does not flow sufficiently at temperatures ranging from about 1,500° to about 2,200°C to form the above described oxygen barrier.

In addition, since the composite of the invention does not contain silicon carbide, undesirable gassing does not occur during high temperature combustion with oxygen, which is characteristic of composites containing silicon carbide, as noted above.

Further, the discrete carbon or graphite particles which are uniformly dispersed in the hot pressed composite coating according to the invention are present in a proportion achieving high thermal shock resistance, and the substantial proportion of refractory components forming the matrix phase of the composite, that is the boride and silicide present in the invention composite, further aids in conferring oxidation resistance, as well as high strength on the composite.

Also, the hot pressing technique of the invention process provides a high density composite which can be fabricated into relatively thin coatings on the substrate to be protected, while providing the advantageous properties, particularly with respect to high oxidation resistance, high thermal shock resistance, and high strength noted above, for protection of the substrate to which the invention composite is bonded.

Thus, it has been found according to the invention that an improved novel composite structure can be produced by hot pressing a specific combination of borides and silicides, as described above and hereinafter, together with carbon particles, particularly graphite, and especially in certain proportions, described in greater detail hereinafter.

In carrying out the procedure for producing the composite of the invention, a substrate or structural component to be protected by a coating of the invention composite, is placed in a die chamber of a hot press for treatment with a mixture of the above noted components of the invention composition. Any high temperature resistant substrate can be effectively coated and protected by the invention composite, including substrates or structural components formed of materials selected from the group consisting of metal, particularly high temperature resistant or refractory metals, metal alloys, carbon and graphite. Specific examples of refractory metal substrates include substrates selected from the group consisting of tantalum, tungsten, tantalum alloys containing tungsten, such as tantalum alloy containing 90% Ta and 10% W, nickel and cobalt alloys, such as the Superalloys which are nickel base alloys containing cobalt, e.g., the alloy marketed as Udimet, and the alloys marketed as Hastalloy, steel and steel alloys.

Where the substrate is a metal part, such as tantalum, tungsten, nickel and cobalt alloy, or steel, prior to introduction of the substrate or part to be coated in the hot press, the part is first coated with a suitable adhesive to provide a tacky surface, an illustrative type of such adhesive being the composition marketed as Duco Cement, understood to be an acetone-butyl acetate composition, or the material marked as Nicrobraze, understood to be a lacquer plastic, comprising polymethyl mechacrylate in a Freon.

The metal substrate containing the tacky surface is then contacted with particles of a material or materials in fine powder form selected from the group consisting of hafnium diboride, titanium diboride, zirconium diboride, tungsten disilicide, iridium and rhenium, either separately or in admixture. Such metal particles or powder is applied to the metal substrate, as by rolling the substrate therein until the latter is completely and uniformly coated with the particulate material, to form an initial coating thereon. The application of such initial coating to the substrate is preferred where the substrate is a metal or alloy, e.g., tantalum, tungsten, or an alloy thereof, to maintain the metal of the substrate ductile by acting as a barrier to carbon transport and to prevent carbonization of the metal, e.g., tantalum, substrate by the carbon or graphite particles contained in the invention composite subsequently hot pressed thereon at the elevated hot pressing temperatures, or when the substrate containing the composite coating of the invention including such carbon or graphite particles, is subjected to a high temperature environment, e.g., of the order of 2,000°C during use or application of the substrate.

Where the substrate is non-metallic, such as when the substrate is graphite, there is no need to first apply an initial, e.g., $HfB_2$, coating as described above, to the substrate, prior to application of the composite of the invention, since the carbon particles or carbon content of the composite can be in direct contact with the non-metallic substrate, e.g., graphite, without any adverse effect on the properties of the substrate.

To the die chamber of the hot press in which the substrate, either with or without the above noted initial coating, is inserted, is added a mixture of the above noted boride, silicide, and carbon particles. As previously noted, the borides employed are the transition metal borides, hafnium diboride, zirconium diboride and titanium diboride, or a mixture of two or more of such borides, and the silicides utilized are tungsten disilicide and molybdenum disilicide, or a mixture of such silicides. A preferred and particularly effective mixture for purposes of the invention is one containing a mixture of $HfB_2$, $WSi_2$ and carbon particles, such mixture being substantially free of silicon carbide. Preferably, the particles of the refractory metal boride and silicide, e.g., hafnium diboride and tungsten disilicide, are of small particle size, e.g., ranging from about 0.1 to about 44 microns. The discrete carbon particles which can be in the form of graphite, amorphous carbon or pyrolytic graphite, or mixtures thereof, are uniformly dispersed in the above mixture of refractory compounds. The carbon particles can be in powder form or in the form of fibers, and in preferred practice graphite fibers are employed, in the form of discontinuous fibers of very short length, the fiber lengths preferably ranging from about 0.0025 inch (64.1 microns) to about 0.35 inch (8,974 microns). These fibers preferably have a diameter in the range from about 0.125 to about 0.000026 inch.

The proportions of boride, silicide and carbon particles in the above noted mixture can range from about 40 to about 70 percent boride, e.g., $HfB_2$, about 16 to about 50 percent silicide, e.g., $WSi_2$, and about 10 to about 16 percent of carbon particles, e.g., graphite fibers, by weight. The above noted weight range of carbon particles corresponds to about a 30 to about a 50 percent proportion of carbon particles by volume of the refractory metal powder-carbon particle mixture. The mixture should not contain more than about 50 volume per cent of carbon particles, corresponding to about 16 percent by weight of carbon particles, because if an excess of carbon particles beyond the above noted 50 volume per cent, or 16 weight per cent, is employed, the proper balance of refractory metal components to carbon is not obtained, resulting in a composite coating on the substrate having inferior oxidation resistance properties. Thus, where the composition contains more than 16 percent carbon or graphite, exceeding 50 percent by volume, and the carbon or graphite becomes the matrix phase, both strength and oxidation resistance of the composite deteriorate rapidly. Too low a carbon content, that is below 10 percent by weight of the mixture, results in a composite of reduced thermal conductivity, reduced thermal shock resistance and generally poor thermal recycling properties. Thermal shock resistance is of prime importance in most applications of the invention composite, and compositions containing below 10 percent by weight of carbon or graphite do not provide adequate thermal shock resistance. The oxidation resistance of a material is of little concern if the material has catastrophically fractured in thermal shock. Thus the range of proportions of carbon or graphite particles employed is deemed critical in order to obtain the improved results of the invention.

Similarly, the total refractory metal content in the mixture containing the carbon particles, and wherein the boride and silicide are within the above noted ranges of proportions, should be between about 80 and about 90 percent by weight of the mixture, in order to obtain the highly improved composite coating of the invention having high oxidation resistance as well as high thermal shock resistance imparted by the presence of the carbon particles dispersed throughout the refractory metal mixture as matrix.

An optimum starting mixture for producing a composite having optimum properties with respect to high oxidation resistance, high thermal shock resistance, high strength, high thermal conductivity and high impact resistance, is a mixture of 66% $HfB_2$, 20% $WSi_2$ and 14% graphite fibers, by weight.

The entire compact in the die of the hot press, that is the substrate surrounded by the above noted boride-silicide-carbon particle mixture, is then hot pressed at a temperature close to the melting point of the silicide, e.g., about 2,100°C in the case of the use of $WSi_2$. Thus, for example hot pressing can be carried out at a temperature ranging from about 1,200° to about 2,200°C, employing a pressure ranging from about 2,000 to about 20,000 psi, for a period of time which can range from about 3 to about 60 minutes. Where steel is employed as the substrate, hot pressing is carried out at temperatures below 1,500°C (the melting point of iron) and at pressures generally in excess of about 8,000 psi.

During hot pressing in a hot press, it is desirable, although not necessary, to maintain the hot press under a vacuum, e.g., corresponding to a pressure which can range from less than about 1 micron to about 400 mm mercury of an inert gas, e.g., helium or argon, and preferably of about 1 to about 5 microns, in order to improve compaction and bonding of the components of the mixture, that is, the refractory boride and silicide with the carbon or graphite particles, and to facilitate removal of gases from the mixture during hot pressing and obtain a high density composite. Whether or not vacuum is employed, an inert gas, e.g., as noted above, should be utilized in the hot press in contact with the starting mixture to avoid premature oxidation of the components of the mixture. However, when a high vacuum is employed, e.g., corresponding to a pressure of about 1 to about 10 microns, an inert gas need not be utilized in the hot press.

The composite formed following hot pressing is integrally bonded to the substrate, together with the metallic powder interlayer initially formed on the substrate where the substrate is formed of a metal such as tantalum, as previously noted. The adhesive or cement initially applied to the substrate to produce a tacky surface for the metal compound or metal powder, e.g., $HfB_2$, initially coated on the substrate, is fugitive, and is decomposed and the resulting gases removed during hot pressing at the elevated temperatures noted above. The carbon or graphite particles or fibers in the hot pressed composite coating remain in discrete particle form distributed uniformly through the composite and aiding in the formation of the composite in the hot pressing operation, as well as conferring the above noted advantageous properties of high thermal shock resistance and high thermal conductivity on the composite coating. Also, the refractory metal compounds, that is the boride and the silicide, are believed to remain in essentially their initial chemically uncombined form, but are well bonded together during the hot pressing to form the matrix for the carbon particles, e.g., graphite fibers, uniformly dispersed through the composite coating. The ceramic or inorganic components, that is the boride and silicide, e.g., $HfB_2$ and $WSi_2$, wet the carbon or graphite particles or fibers, and bond thereto. The composite coating, e.g., containing hafnium diboride and tungsten disilicide, forms a glass, e.g., having the formula $HfO_2 \cdot SiO_2 \cdot B_2O_3 \cdot W_2O_5$, which becomes plastic at the above noted use temperatures of about 1,500° to about 2,200°C, and flows over the substrate structure, preventing oxygen diffusion to the substrate, and preventing oxidation of the composite, as previously noted.

The composite coating produced according to the invention has a high flexural strength ranging from about 20,000 to about 50,000 psi, as compared for example to prior art refractory coatings such as that known as JTA of Union Carbide, formed of a graphite base material and containing zirconium diboride and silicon carbide, having an average flexural strength on the order of only about 4,000 psi. Of particular significance, the composite produced according to the invention has high oxidation resistance due to the high total content of refractory materials, including the boride and silicide, such oxidation resistance at 2,200°C and 90 minutes resulting in a weight loss ranging between about 0.05 and about 0.5 percent as compared to prior art composites such as the JTA and similar types noted above, which when tested under the same conditions result in a weight loss ranging from about 5 to about 50 percent.

Due to the absence of silicon carbide in the composite of the invention, a lower melting point glass is formed by the refractory metal components of the composite, at temperatures ranging from about 1,500° to about 2,200°C, as compared to the glass formed when silicon carbide is present, and the composite of the invention as result, has very good oxidation resistance over the above temperature range. However, the composite of the invention also has unexpectedly good oxidation resistance properties above 2,200°C, e.g., between 2,200°C and 2,800°C surface temperatures for short periods of time due to the temperature gradient of about 400° to about 900°C across a 60 mil thickness of the glass layer.

Also, due to the presence of the carbon particles dispersed throughout the matrix, the composite of the invention containing the above noted combination of boride and silicide, together with the carbon particles, has a high thermal conductivity ranging from about 0.05 to about 0.18 cal/cm sec°C, as compared to the thermal conductivity of prior art refractory composites, which generally have a thermal conductivity ranging from about 0.01 to about 0.05 cal/cm sec°C. In addition, the composite of the invention has excellent thermal shock properties as result of the carbon particles or graphite fibers dispersed throughout the refractory metal compound matrix. The high thermal conductivity of the invention composite renders the composite particularly desirable for use under ablation conditions, affording ablation protection superior to prior art composites such as the JTA composite noted above, and the excellent thermal shock resistance of the invention composite renders the composite particularly effective in applications requiring sudden and sharp changes in temperature, as in many aerospace applications, thus effectively protecting the coated substrate from the effects of such rigorous temperature environments.

Another advantage of the invention composite containing $WSi_2$ or $MoSi_2$ is the evaporative cooling effect caused by the sublimation of the corresponding oxides produced by formation of the resulting glass. The heat required to sublime, e.g., $W_2O_5$, can appreciably reduce glass-surface temperatures, and in turn, substrate temperatures. Further, the use of a lower melting silicide, e.g., $WSi_2$, over the use temperature range of about 1,500°C to about 2,200°C, and in the complete absence of silicon carbide, assists substantially in providing enhanced thermal shock resistance by the simple mechanism of becoming plastic before the boride or borides which are present would reach a plastic stage, leaving no unplasticized higher melting silicon carbide.

As result of the hot pressing operation, the composite produced according to the invention has a high density ranging from about 2.5 to about 10 grams/cc, and is compressed to from about 95 to about 99 percent of theoretical density. Such densification of the composite improves its impact resistance. The thickness of the composite coatings produced according to the invention can vary widely, but such thicknesses generally range from about 0.050 to about 3 inches, usually about 0.2 to about 0.5 inch. Due to the high density of the invention composite, and the high oxidation resistance thereof, coating thicknesses of the composite can be made one-tenth to about one-half of the thickness of prior art refractory composites noted above, and still obtain comparable oxidation resistance as compared to such prior art composite of double to ten times the thickness.

As previously noted, the invention composite forms a glass coating which provides a temperature gradient of 400° to 900°C across a 60 mil thickness of the glass layer. If the composite is operating in an ablation mode, the composite continuously regenerates a protective glass coating which is self-healing. In other words, the composite functions as a regenerative type oxidation resistant composite.

In addition, the composite of the invention has good hardness and machining properties, and the metalography of the composite shows good dispersion of the carbon particles, e.g., graphite fibers, throughout the refractory metal boride and silicide matrix.

The invention composite and the substrate coated therewith have a wide variety of applications, including, as noted above, use in fabrication of turbine blades and aircraft structural material for high speed aircraft, use on the leading edge of high speed aircraft and space vehicles, requiring high strength at elevated and rapidly changing temperatures and high oxidation resistance, coatings to generally protect metal and graphite substrates of the types noted above in oxidizing atmospheres at temperatures of the order of 2,000°C for long periods, and coatings for thermionic diode applications involving combustion heating at temperatures of the order of about 1,800°C. The invention composite and the substrates protected thereby, are also applicable as insulation for rocket motors, protective oxidation coatings for automobile exhaust manifolds and mufflers, heat shields, and particularly as ablation coatings. In addition, the invention composite has application as high temperature furnace elements and as electrodes for electrical discharge machinery and for molten salt electrolysis (aluminum production). Also, graphite yarn can be coated with the composite starting mixture of boride, e.g., $HfB_2$, silicide, e.g., $WSi_2$, and carbon particles, and the coated yarn wound directly on mandrels, followed by vacuum hot pressing of the wound mandrel to produce any desired shape such as airfoils, hollow cylinders, and the like.

The invention composite has particular applicability to high temperature load-bearing materials in oxidizing atmospheres, for protecting isotope fuel blocks and rocket nozzle liners. In nuclear fuel technology it is generally required that the fuel be consolidated or densified from 90 to 98 percent of theoretical to achieve high specific heat or power output. A particularly effective and important application of the invention composite has been developed for the simultaneous consolidation and encapsulation of isotope heat sources for space electric power systems and isotope heaters to prevent escape of radioactive fuel employed therein, such as $Pm_2O_3$, $Pu^{238}$, curium, and the like. The encapsulation of such isotopic fuel capsule, employing the refractory composite of the invention, removes the hazards of the environments encountered during all operational phases of capsule life, including protection of the capsule under reentry or ablation conditions.

Thus, by the hot pressing procedure of the invention for applying the composite to the substrate, the consolidation, that is the densification, of the composite during the hot pressing operation, simultaneously results in consolidation of the substrate, and in the case of the application of the composite for encapsulation of a radioisotope fuel block, results in the simultaneous consolidation or densification of the container for the fuel block, which can be formed of tantalum, and its contents including the fuel block, together with the composite, into a unitary compact, so that the entire compact can be formed simultaneously in one basic controlled hot pressing step. Such simplified technique of assembly and fabrication of a refractory composite according to the invention around the container for an isotope fuel block, substantially reduces the many steps required heretofore in fabricating such heat sources by conventional means, and is economically advantageous and also minimizes radiation hazards to workers.

Figure 2:
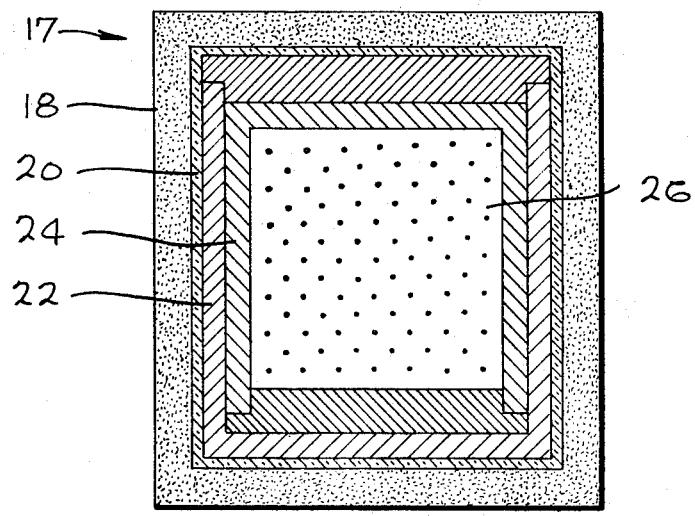

The following are examples of practice of the invention, described in connection with the accompanying drawing wherein FIG. 1 is a schematic partial cross-section of a composite produced according to the invention, and bonded to a substrate; and FIG. 2 is a schematic cross-sectional illustration of the encapsulation of a container containing an isotope fuel block, with a composite refractory outer coating according to the invention.

EXAMPLE 1

A tantalum substrate or member is treated on a surface thereof with Duco Cement, referred to above, to form a tacky surface. The substrate or member is then contacted on the tacky surface thereof with a fine $HfB_2$ powder to uniformly coat the tacky surface.

The tantalum substrate or member having an initial $HfB_2$ coating on its surface is inserted into the die chamber of a vacuum hot press.

A mixture of 66% $HfB_2$, 20% $WSi_2$, both in powder form and having a particle size ranging from about 0.1 to about 5 microns, and 14 percent of discontinuous graphite fibers having an average length of about 4,000 microns, by weight, are mixed together in a jar mill for about 4 hours. The mixed powder is then placed in the die of the vacuum hot press in contact with the $HfB_2$ coated surface of the tantalum member or plate, and the mixture and the $HfB_2$-coated tantalum substrate in the die are subjected to hot pressing in the press at a temperature of 2,100°C, under a vacuum corresponding to a pressure of about 1 micron, and at a pressure of 4,000 psi for about 15 minutes.

The billet containing the composite and tantalum member is then removed from the press, resulting in an article as illustrated in FIG. 1 of the drawing, in which the tantalum substrate 10 having the initial coating 12 of $HfB_2$ adhered to one surface thereof, has a dense composite coating 14 formed of the refractory matrix of $HfB_2$ and $WSi_2$, bonded to the short graphite fibers 15, uniformly distributed throughout the matrix. The composite coating 14 of about 0.25 inch in thickness and of high density is securely bonded to both the $HfB_2$ intermediate layer 12, and the substrate 10. The density of the $HfB_2$—$WSi_2$—C composite coating 14 exceeds 98 percent of theoretical density.

The properties of the composite 14 of FIG. 1, produced according to the invention are as shown in Table 1 below:

TABLE 1

| Property | Value |
|---|---|
| Density | 7.1 g/cm³ |
| Thermal conductivity | 0.12 cal/cm sec°C. |
| Thermal shock properties | Excellent |
| Flexural strength (20°C) | 40,000 psi |
| Melting point of composite | About 2,300°C. |
| Oxidation resistance (2,200°C) | Weight loss of less than 0.08% in 120 minutes |
| Machining properties | Good |
| Hardness of composite ($HfB_2$-$WSi_2$ matrix) | About 3,300 Knoop, Kg/mm² at 75°F. |

From the above Table, it is seen that the hafnium diboride-tungsten disilicide-carbon composite produced as described above by hot pressing according to the invention, has high oxidation resistance, high flexural strength, high density, good thermal conductivity and excellent thermal shock resistance.

EXAMPLE 2

The procedure of Example 1 is followed, except that in place of the tantalum substrate, the composite of Example 1 is applied or coated on a double tantalum capsule or container containing a radioisotope fuel block, forming an isotope heater.

Employing such tantalum container and isotope heat source, the container is first coated with a suitable adhesive such as Duco Cement adhesive, to provide a tacky outer surface, and the capsule or container is then rolled in the $HfB_2$ powder to form the initial hafnium diboride coating completely and uniformly over the entire outer surface of the tantalum container.

The capsule is then inserted into a hot press die chamber, as described in Example 1, and the hafnium diboride-tungsten disilicide-graphite fiber mixture is placed in the die and the capsule symmetrically surrounded with such material.

During the hot pressing of the above refractory mixture and tantalum container or capsule containing the isotope fuel, e.g., $^{238}PuO_2$, under the conditions described in Example 1 above, simultaneous consolidation or densification of the composite coating, the tantalum container and the isotope fuel block therein occurs, and encapsulation of the isotope fuel block within the tantalum capsule or container is achieved, which is protected by the highly oxidation resistant composite coating.

The article thus produced is removed from the die chamber of the hot press, and referring to FIG. 2 of the drawing, it is noted that the composite $HfB_2$·$WSi_2$·C coating 18 produced on the resulting article 17 in the hot pressing operation, and formed over the initial $HfB_2$ coating 20 is integrally bonded and consolidated with the double tantalum containers 22, 24, housing the radioisotope fuel block 26, the density of the $HfB_2$·$WSi_2$·C composite coating 18 and the fuel block 26 exceeding 98 percent of theoretical density. The composite 18 protecting and encapsulating the isotope fuel block has properties substantially the same as those noted in Table 1 in Example 1 above.

Such compact 17 is thermally cycled from room temperature to 2,000°C as a further test of oxidation resistance. Such thermal cycling is repeated five times, that is, three minutes for cooling and 3 minutes for reheating during each cycle. The composite coating 18 shows excellent oxidation resistance, preventing any oxidation of the tantalum capsule or its contents.

EXAMPLE 3

A double tantalum container with isotope fuel block and having the outer composite coating of the invention produced as described in Example 2 above, and illustrated at 17 in FIG. 2 is subjected to ablation testing.

A similar test is made with the same type of double tantalum capsule containing isotope fuel block but having a different outer composite coating, namely, an JTA type graphite base, around the double tantalum capsule, in place of the $HfB_2 \cdot WSi_2 \cdot C$ coating of the invention, the JTA graphite coating having the same thickness as the former coating of the invention.

The encapsulated fuel block with the JTA graphite base coating is ablation tested under the same conditions as the encapsulated tantalum container with the composite of the invention, produced as described in Example 2, the data and results for these comparisons being set forth in Table 2 below, the specimens marked A being the capsules encapsulated with the ATJ graphite base coating and the specimens marked B encapsulated with the $HfB_2 \cdot WSi_2 \cdot C$ coating of the invention.

In these tests, the gas (air) was blown through a discharge nozzle against the test specimens using standard ablation test procedure.

TABLE 2

|  | A | B | A | B |
|---|---|---|---|---|
| Gas | Air | Air | Air | Air |
| Test time (sec) | 45 | 45 | 120 | 120 |
| Btu/ft²-sec | 785 | 785 | 785 | 785 |
| Stagnation pressure (atm) | 0.1 | 0.1 | 0.1 | 0.1 |
| Enthalpy Btu/lb | 13,000 | 13,000 | 13,000 | 13,000 |
| Velocity of Gas (Mach. No.) | 3 | 3 | 3 | 3 |
| Gas temperature (°C) | 2800 | 2800 | 2800 | 2800 |
| Weight loss of specimen (%) | 42.7 | 2.9 | 89.6 | 3.2 |

From the above Table 2, it is seen that under the same ablation conditions, the weight loss of the composites of the invention, specimens B, is of the order of about 3 percent, as compared to a substantially higher weight loss ranging from about 43 to about 90 percent for the JTA graphite base coated specimens A of the prior art, under the same test conditions, evidencing substantially improved ablative effectiveness of the invention composite as compared to the ATJ graphite base of the prior art.

EXAMPLE 4

The procedure of Example 1 is repeated, but employing as the substrate, a stainless steel substrate, employing as the initial coating material a fine powder of titanium diboride, and employing as the mixture incorporated into the die of the hot press, together with the substrate, a mixture of 50 percent hafnium diboride, 36 percent tungsten disilicide, and 14 percent Thornel 50 discontinuous graphite yarn or fibers, by weight.

In this example, hot pressing is carried out at temperature of about 1,350°C and at pressure of about 15,000 psi.

Results similar to those of Example 1 are obtained.

EXAMPLE 5

The procedure of Example 1 is repeated except employing as the substrate a tungsten substrate, employing as the initial coating tungsten disilicide powder, and employing as the mixture added to the die chamber of the hot press with the tungsten substrate, a mixture of 70% $HfB_2$, 16% $WSi_2$, and 14% graphite fibers by weight.

Results similar to those of Example 1 are obtained.

EXAMPLE 6

The procedure of Example 1 is repeated, but employing as the substrate a graphite substrate or member, and omitting the steps of applying Duco Cement and the initial $HfB_2$ coating to the substrate.

Also, the mixture added to the die chamber of the hot press, together with the graphite substrate, is a mixture of 65 percent hafnium diboride, 24 percent tungsten disilicide and 11 percent amorphous carbon particles, by weight.

The hot pressing operation is carried out at a temperature of about 1,500°C and at pressure of about 10,000 psi for a period of about 15 minutes.

The result is a high density refractory composite produced on the graphite substrate, such composite having high strength, high oxidation resistance, good thermal conductivity and thermal shock resistance, and also high impact resistance.

EXAMPLE 7

The process of Example 1 is repeated, but employing as the mixture placed in the die chamber of the hot press, together with the tantalum substrate, a mixture of 60 percent zirconium diboride, 28 percent molybdenum disilicide, and 12 percent of short discontinuous graphite fibers, by weight.

The hot pressing operation is carried out at temperature of about 2,000°C, employing a vacuum corresponding to a pressure of 5 microns and a pressure of about 8,000 psi, for a period of about 30 minutes.

The resulting composite has properties comparable to those of Example 1 above.

EXAMPLE 8

The procedure of Example 1 is followed, but employing as the mixture incorporated in the die chamber of the hot press, together with the tantalum substrate, a mixture of 45 percent titanium diboride, 39 percent tungsten disilicide, and 16 percent discontinuous graphite fibers, by weight.

The hot pressing is carried out at a temperature of about 1,800°C, at a vacuum corresponding to a pressure of 10 microns, a pressure of about 15,000 psi, for a period of 20 minutes.

The results obtained are comparable to those obtained in Example 1.

EXAMPLE 9

The procedure of Example 2 is followed, except employing as the container a tantalum alloy of tungsten, containing 90 percent tantalum and 10 percent tungsten.

The results obtained are similar to those of Example 2.

EXAMPLE 10

The procedure of Example 1 is repeated except that a blanket of argon is employed in contact with the mixture of $HfB_2$, $WSi_2$ and graphite fibers in the hot press, at a pressure of about 400 mm mercury.

Results similar to those of Example 1 are obtained.

From the foregoing, it is seen that the invention provides novel improved refractory composites, characterized particularly by possessing high oxidation resistance, high strength, good thermal shock resistance, and good thermal conductivity, and having high density, such composites having wide application for use in rigorous environments of high temperatures and rapid temperature changes, for protection of various structural parts, and to procedure for producing the improved composite and article comprising said composite bonded to a substrate.

Since various modifications and adaptations of the the invention will be apparent to those skilled in the art and can be resorted to without departing from the spirit and scope of the invention, the invention is not to be taken as limited except by the scope of the appended claims.

I claim:

1. A high density, oxidation resistant, thermal shock resistant and high strength composite having high thermal conductivity and high impact resistance, consisting essentially of, by weight (a) about 40 to about 70 percent of a boride selected from the group consisting of hafnium diboride, zirconium diboride and titanium diboride, and mixtures thereof, (b) about 16 to about 50 percent of a silicide selected from the group consisting of tungsten disilicide and molybdenum disilicide, and mixtures thereof, and (c) about 10 to about 16 percent by weight of discrete carbon particles selected from the group consisting of graphite, amorphous carbon and pyrolytic graphite, and mixtures thereof, said composite being substantially free of silicon carbide, said boride and said silicide forming a matrix, said carbon particles being dispersed in said matrix.

2. A composite as defined in claim 1, wherein said carbon particles are in the form of graphite fibers.

3. A composite as defined in claim 1, wherein said boride is hafnium diboride and said silicide is tungsten disilicide.

4. A composite as defined in claim 2, wherein said boride is hafnium diboride and said silicide is tungsten disilicide.

5. A composite as defined in claim 4, consisting essentially of, by weight, 66 percent hafnium diboride, 20 percent tungsten disilicide and 14 percent graphite fibers.

6. An article comprising a high temperature resistant substrate containing a bonded coating comprising a composite consisting essentially of, by weight (a) about 40 to about 70 percent of a boride selected from the group consisting of hafnium diboride, zirconium diboride and titanium diboride, and mixtures thereof, (b) about 16 to about 50 percent of a silicide selected from the group consisting of tungsten disilicide and molybdenum disilicide, and mixtures thereof, and (c) about 10 to about 16 percent by weight of discrete carbon particles selected from the group consisting of graphite, amorphous carbon and pyrolytic graphite, and mixtures thereof, said composite being substantially free of silicon carbide, said boride and said silicide forming a matrix, said carbon particles being dispersed in said matrix.

7. An article as defined in claim 6, said substrate being selected from the group consisting of metals, metal alloys, carbon and graphite.

8. An article as defined in claim 6, said substrate being selected from the group consisting of tantalum, tungsten, tantalum alloys containing tungsten, nickel and cobalt alloys, steel and steel alloys, and graphite.

9. An article as defined in claim 8, said carbon particles of said composite being graphite fibers.

10. An article as defined in claim 9, said boride of said composite being hafnium diboride and said silicide being tungsten disilicide.

11. An article as defined in claim 10, said composite consisting essentially of about 66 percent hafnium diboride, about 20 percent tungsten disilicide and about 14 percent of said graphite fibers.

12. An article as defined in claim 11, said substrate being tantalum.

13. An article as defined in claim 6, said substrate being a high temperature resistant metal container containing therein an isotope fuel block, said composite coating being integrally bonded to the entire outer surface of said container.

14. An article as defined in claim 12, said substrate being a high temperature resistant metal container containing therein an isotope fuel block, said composite coating being integrally bonded to the entire outer surface of said container.

15. The process of producing an article comprising a substrate containing a high strength, oxidation and temperature resistant, and high density refractory coating, comprising hot pressing at temperature ranging from about 1,200° to about 2,200°C against a surface of a high temperature resistant substrate, a mixture consisting essentially of, by weight (a) about 40 to about 70 percent of a boride selected from the group consisting of hafnium diboride, zirconium diboride and titanium diboride, and mixtures thereof, (b) about 16 to about 50 percent of a silicide selected from the group consisting of tungsten disilicide and molybdenum disilicide, and mixtures thereof, and (c) about 10 to about 16 percent of discrete carbon particles selected from the group consisting of graphite, amorphous carbon and pyrolytic graphite, and mixtures thereof, said hot pressed mixture being substantially free of silicon carbide, to form an integral bonded composite coating of said hot pressed mixture on said substrate, said boride and said silicide of said composite forming a matrix, said carbon particles being dispersed in said matrix.

16. A process as defined in claim 15, said substrate being selected from the group consisting of metals, metal alloys, carbon and graphite.

17. A process as defined in claim 16, employing pressures during said hot pressing ranging from about 2,000 to about 20,000 psi for a period ranging from about 3 to about 60 minutes.

18. A process as defined in claim 17, said boride of said mixture being hafnium diboride and said silicide being tungsten disilicide, and said carbon particles being graphite fibers.

19. A process as defined in claim 18, said mixture consisting essentially of about 66 percent hafnium diboride, about 20 percent tungsten disilicide, and about 14 percent graphite fibers, by weight.

20. A process as defined in claim 18, said hot pressing being carried out in a hot press under vacuum corresponding to a pressure of about 1 micron to about 400 mm mercury of an inert gas.

21. A process as defined in claim 20, said hot pressing being carried out at about 2,100°C, and at about 4,000 psi pressure, for a period of about 15 minutes, said hot press being under a vacuum corresponding to a pressure of about 1 to about 5 microns.

22. A process as defined in claim 21, said substrate being tantalum.

23. A process as defined in claim 15, employing a high temperature resistant metal substrate, including first applying an adhesive to said substrate, and then coating over said adhesive an initial coating of a fine powder of a substance selected from the group consisting of hafnium diboride, titanium diboride, zirconium diboride, tungsten disilicide, iridium and rhenium, and mixtures thereof.

24. A process as defined in claim 22, employing a high temperature resistant metal substrate, including first applying an adhesive to said substrate, and then coating over said adhesive an initial coating of a fine powder of a substance selected from the group consisting of hafnium diboride, titanium diboride, zirconium diboride, tungsten disilicide, iridium and rhenium, and mixtures thereof.

25. A process as defined in claim 15, said substrate being a high temperature resistant metal container containing therein an isotope fuel block, said composite coating being integrally bonded to the entire outer surface of said container; said composite coating, said container and said isotope fuel block being simultaneously consolidated into a unitary compact during said hot pressing.

26. A process as defined in claim 23, said substrate being a high temperature resistant metal container containing therein an isotope fuel block, said composite coating being integrally bonded to the entire outer surface of said container; said composite coating, said container and said isotope fuel block being simultaneously consolidated into a unitary compact during said hot pressing.

27. A process as defined in claim 24, said substrate being a high temperature resistant metal container containing therein an isotope fuel block, said composite coating being integrally bonded to the entire outer surface of said container; said composite coating, said container and said isotope fuel block bieng simultaneously consolidated into a unitary compact during said hot pressing.

* * * * *